Feb. 13, 1973  S. J. JOHNSON  3,715,789
HOB
Filed July 19, 1971  5 Sheets-Sheet 1
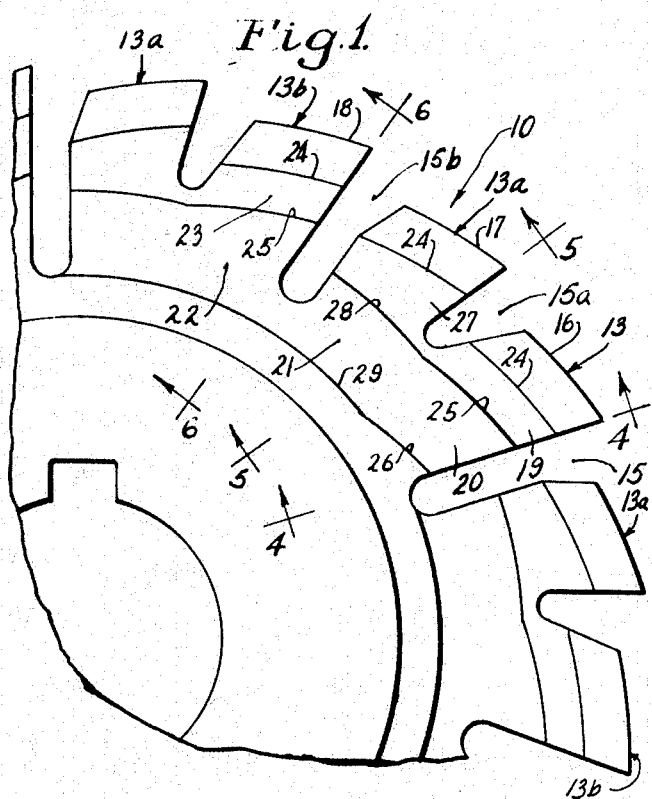
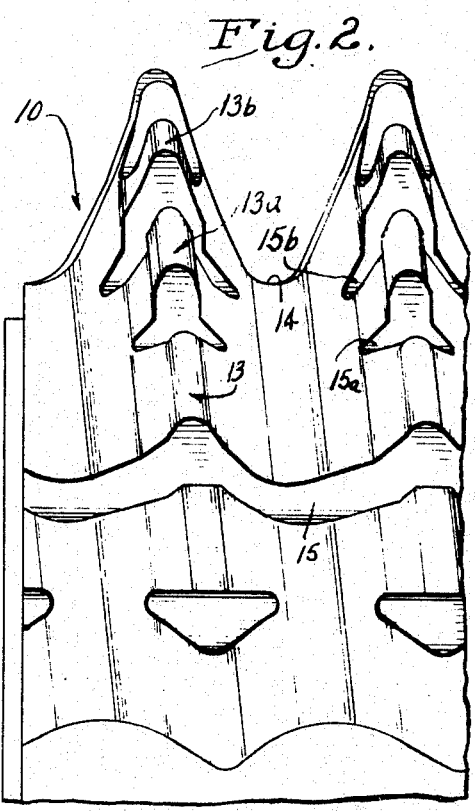
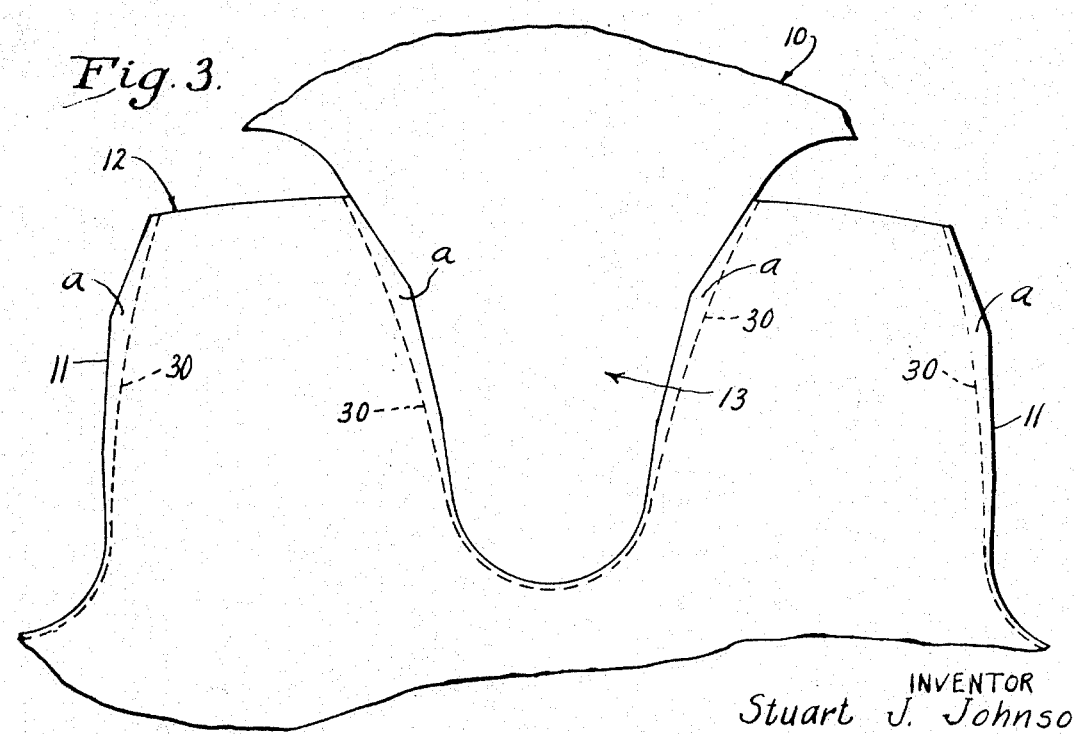
INVENTOR
Stuart J. Johnson
ATTORNEYS

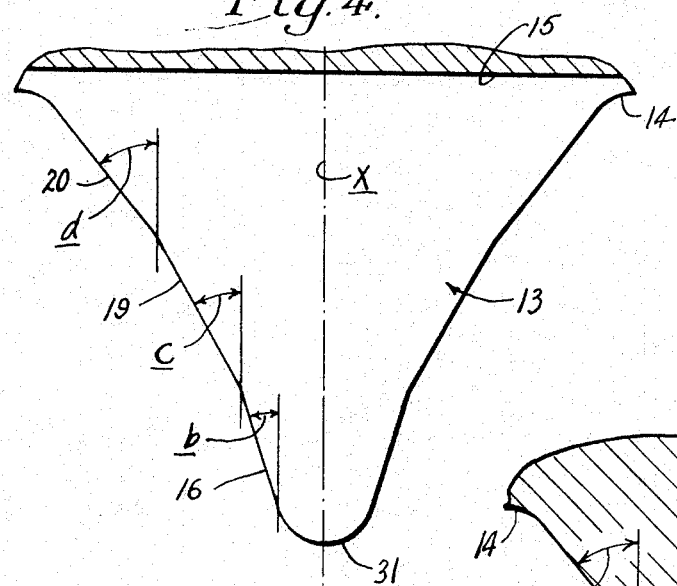
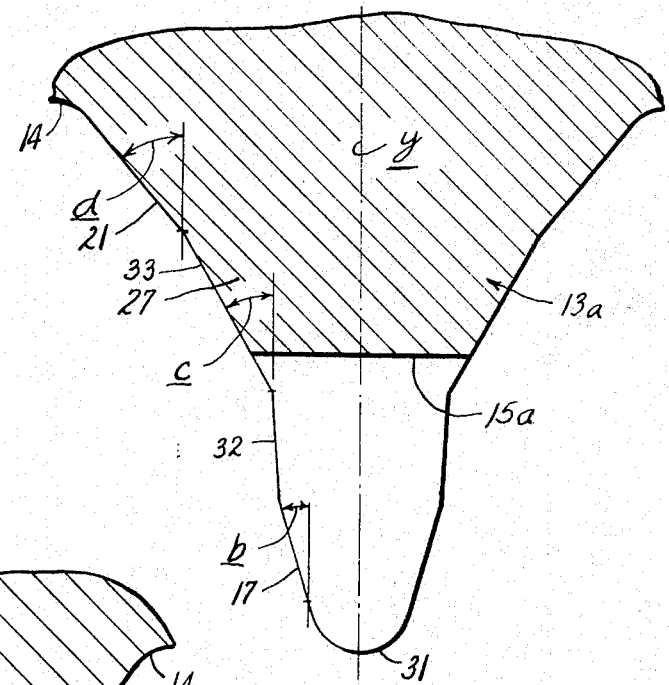
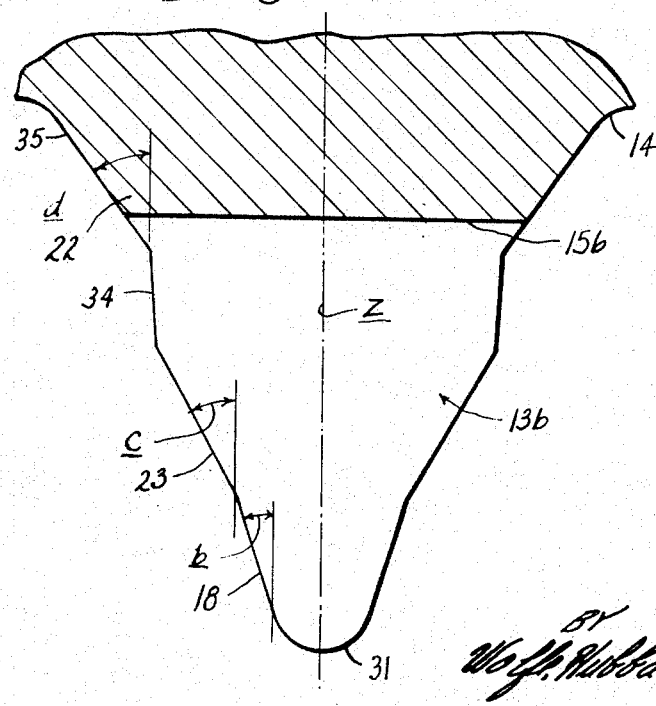

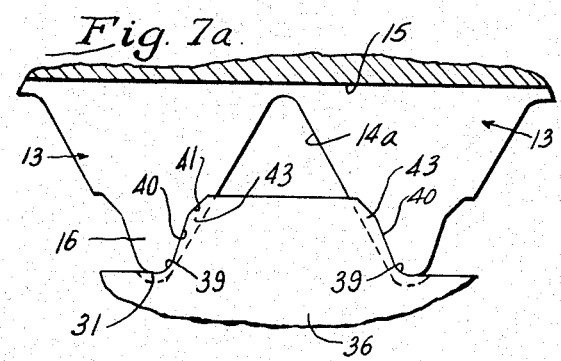
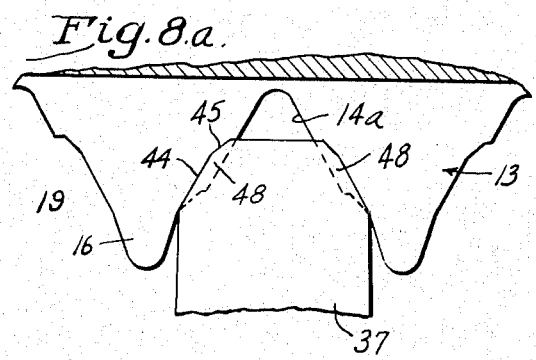
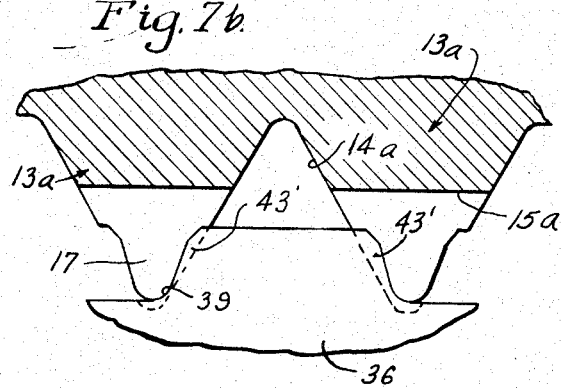
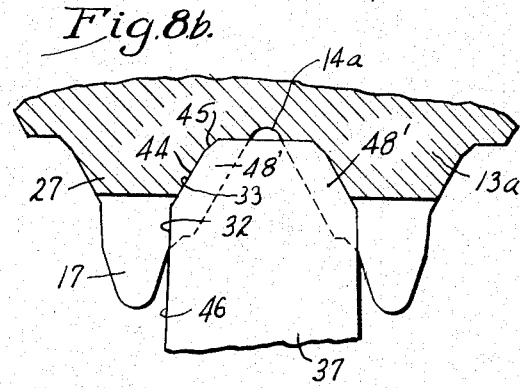
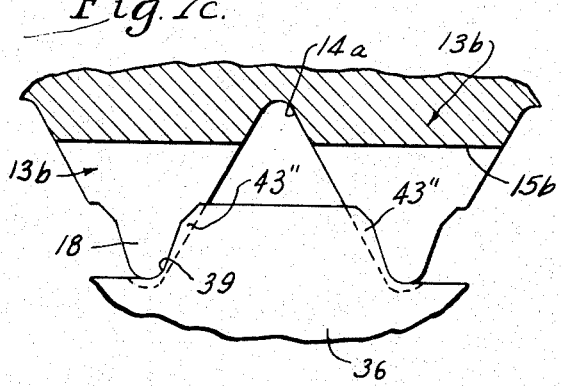
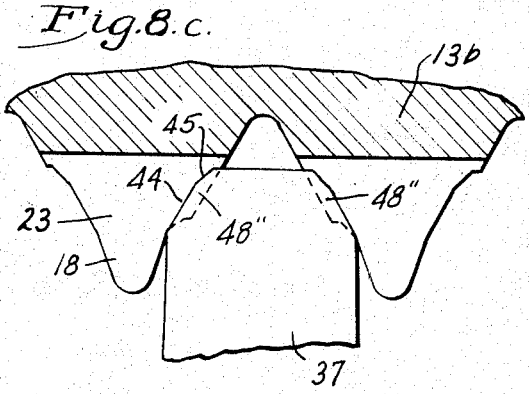

Feb. 13, 1973   S. J. JOHNSON   3,715,789
HOB

Filed July 19, 1971   5 Sheets-Sheet 4

INVENTOR
Stuart J. Johnson
BY
Wolfe, Hubbard, Leydig, Voit & Osann, Ltd.
ATTORNEYS

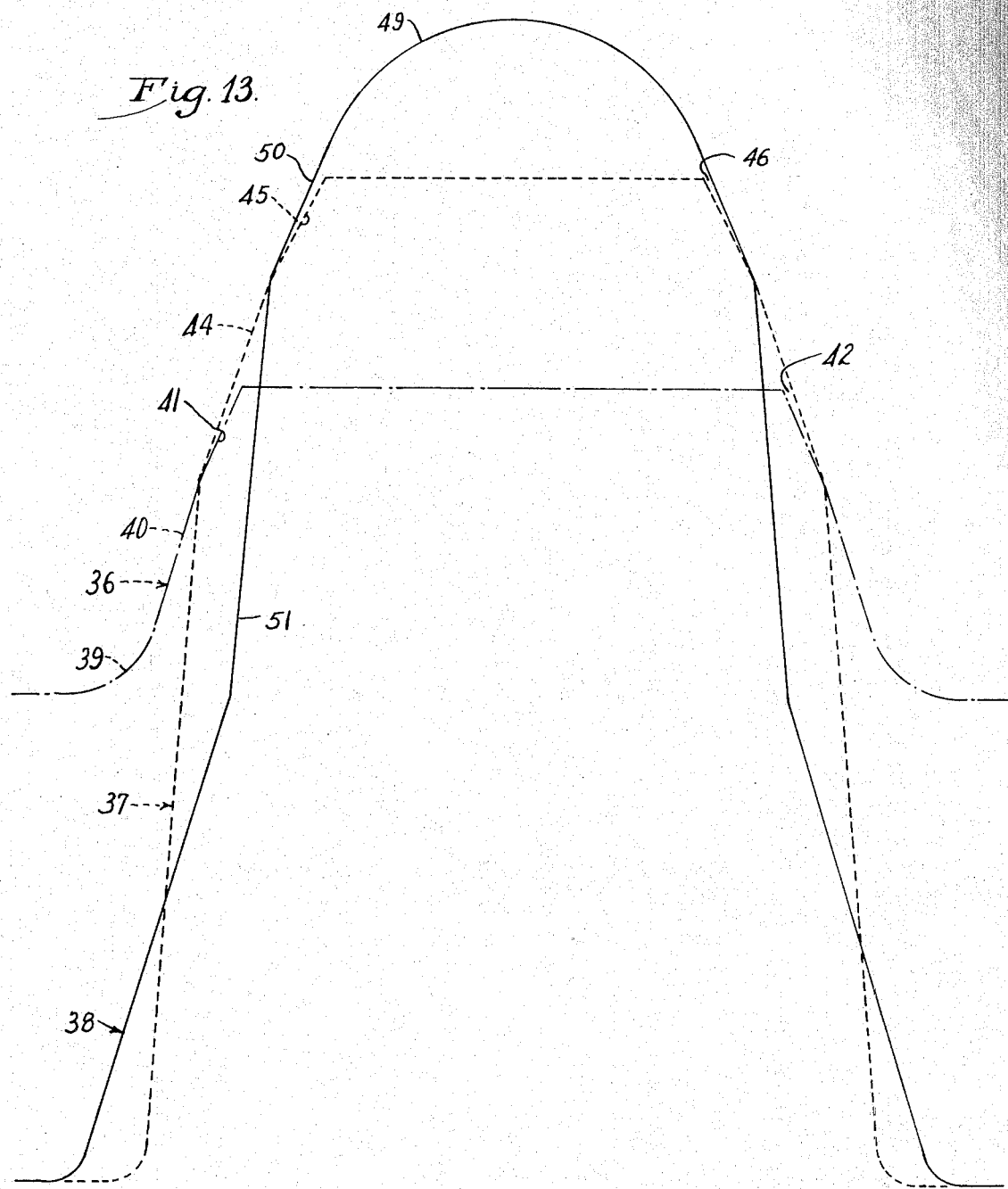

United States Patent Office 3,715,789
Patented Feb. 13, 1973

3,715,789
HOB
Stuart J. Johnson, Rockford, Ill., assignor to Barber-Colman Company, Rockford, Ill.
Filed July 19, 1971, Ser. No. 163,800
Int. Cl. B26d 1/12
U.S. Cl. 29—103 B
12 Claims

ABSTRACT OF THE DISCLOSURE

A hob for cutting gears and the like in which the teeth are formed in repeating sets of at least two teeth and the teeth of each set have different radial lengths whereby all of the teeth cut to generate the final form of the root portion of the gear teeth and only some of the hob teeth generate the final form of the tip portions of the gear teeth. While the hob may be a finishing tool, more usually it is a rough-cutting tool and, in this context, the final form is the form of the gear teeth before finishing where that is required. The teeth of the hob, when used as a rough-cutting tool, are given a profile wich permits the metal that must be removed by the finishing tool to be distributed on the gear teeth in a preselected manner so as to make more effective use of the finishing tool.

BACKGROUND OF THE INVENTION

This invention relates to milling cutters for cutting gears, sprockets, splines, and the like and is especially suited for hobs for cutting gears. More particularly, the invention has reference to a milling cutter of the type in which, as compared to conventional cutters, there are a greater number of teeth to increase the speed of the cutting operation, that is, the volume of metal removed per unit of time. The increase in the number of teeth is achieved without weakening the teeth by making the teeth of different lengths so that all of the teeth cut the final form of the root portions of the teeth of the workpiece while only some of the cutter teeth (herein called full depth teeth) cut the final form of the tip portions of the workpiece teeth. In some applications, the cutter may include teeth of an intermediate length and these teeth cut not only the final form of the root portions of the workpiece teeth but also of intermediate portions although they do not cut the final form of the tip portions. Usually, the teeth of the cutter are arranged in repeating sets with each set including at least one tooth of each length. For the most part, the milling cutter is a rough-cutting tool and, thus, the reference to final form means the form given the teeth of the workpiece by the cutter. Examples of milling cutters of this general type are disclosed in Fawcus Pat. No. 1,069,164 and Bentjens Pat. No. 3,374,518.

SUMMARY OF THE INVENTION

One object of the invention is to provide a new and improved milling cutter of the foregoing type which, as compared to prior cutters, has stronger teeth and thus is capable of removing an even greater volume of metal per unit of time.

Another object is to achieve the foregoing by forming the tip portions of all the cutter teeth on Archimedean spirals, by forming all the cutting edges of the full depth teeth on Archimedean spirals and by forming the root portions of the remaining partial teeth on a radius so that the root portions of the partial teeth are comparatively wide but, at the same time, do not produce an interference in the cutting operation.

It is also an object of the invention to provide the cutter with teeth formed in a novel manner so that the metal to be removed from the teeth of the workpiece by a finishing tool may be located selectively so as to reduce the stresses on both the workpiece teeth and the finishing tool during the finishing operation.

A further aim is to achieve the foregoing object by forming the side edges of at least the full-depth teeth of the cutter with a profile that has a changing angle from the tip of the tooth to the root.

BRIEF DESCRIPTION OF THE DRAWINGS

FIG. 1 is a fragmentary end view of a hob incorporating my new invention.

FIG. 2 is a fragmentary elevational view of the hob.

FIG. 3 is an enlarged fragmentary view showing one tooth of the hob cooperating in the generalization of gear teeth.

FIG. 4 is an enlarged fragmentary sectional view taken along the line 4—4 in FIG. 1.

FIG. 5 is an enlarged fragmentary sectional view taken along the line 5—5 in FIG. 1.

FIG. 6 is an enlarged fragmentary sectional view taken along the line 6—6 in FIG. 1.

FIG. 7a is a sectional view similar to FIG. 4 and showing a forming tool.

FIG. 7b is a view similar to FIG. 5 and showing a forming tool.

FIG. 7c is a view similar to FIG. 6 and showing a forming tool.

FIG. 8a a view similar to FIG. 4 and showing a second forming tool.

FIG. 8b is a view similar to FIG. 5 and showing a second forming tool.

FIG. 8c is a view similar to FIG. 6 and showing a second forming tool.

FIG. 13 is a composite view of the forming tools illustrated in FIGS. 10, 11 and 12.

DETAILED DESCRIPTION OF THE PREFERRED EMBODIMENT

Figure 9A:
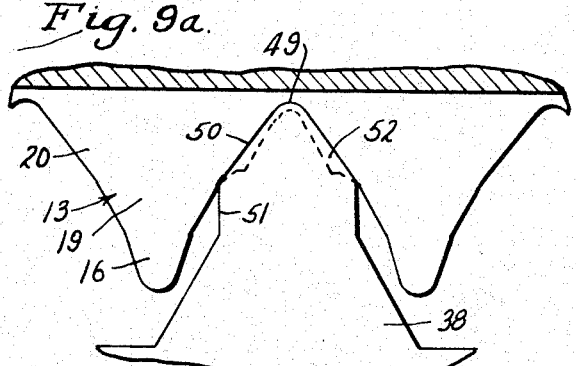
FIG. 9a is a view similar to FIG. 4 and showing a third forming tool.

While the invention is applicable to milling cutters of various types and may be used to cut teeth on gears, sprockets, splines and the like, it is shown in the drawings for purposes of illustration as embodied in a hob 10 for cutting the teeth 11 (FIG. 3) of a gear 12 with the sides of the teeth 13 of the hob formed by a helical thread 14 (FIG. 2) while the leading faces of the hob teeth are defined by longitudinally extending gashes 15. In order to increase the speed of the hobbing operation, that is, the volume of metal removed per unit of time, the number of teeth around the periphery of the hob is increased as compared to a standard hob and at least half of the gashes are substantially less than full depth so that the hob teeth are sufficiently strong even though their circumferential length is comparatively short. As will be seen from FIG. 2, however, the thread 14 extends down to approximately the same depth as the full depth gashes for all the teeth. With this arrangement, all of the teeth are fully effective in removing a major portion of the metal in generating the gear teeth 11 from a blank, that is, the metal at the root portions of the gear teeth, while only some of the teeth are fully effective in removing the metal at the tip portions of the gear teeth.

In the present instance, there are gashes 15, 15a and 15b of three different depths and the gashes thus define a hob with full depth teeth 13 and partial teeth 13a and 13b of three different profiles. The teeth are arranged in repeating series around the periphery of the hob and more than one tooth profile may be included in each series if desired. Herein, two teeth 13a are included in each series and the teeth of each series are arranged as follows: tooth 13, tooth 13a, tooth 13b and tooth 13a. Thus, all of the teeth in each series remove some metal from the gear blank but only the full depth tooth 13 of the series is effective in fully generating the gear teeth 11. Of course, different arrangements may be used as each hob design dictates so long as each series includes at least one tooth which only partially generates the gear teeth and one tooth which fully generates the gear teeth to their final form. The milling cutter contemplated by the invention may be used as a finishing tool, particularly where a high degree of accuracy is not required but more commonly it is a rough-cutting tool and, accordingly, the reference to final form of the teeth of the workpiece means the form as cut by the milling cutter even through a subsequent finishing operation may be required.

The present invention contemplates the provision of a new and improved milling cutter of the foregoing type which has stronger teeth and thus is capable of removing an even greater volume of metal per unit of time as compared to prior cutters of this type. In general, this is achieved by making the root portions of the partial teeth in a novel manner so they are wider but still do not produce an interference during the cutting operation. More specifically, the cutting edges at the tip portions 16, 17 and 18 of all the hob teeth are formed on Archimedean spirals, all the cutting edges of the tip, intermediate and root portions 16, 19 and 20 of the full depth teeth 13 are formed on an Archimedean spiral, and root portions 21 and 22 of the remaining teeth 13a and 13b are formed on a radius.

In the preferred form as applied to the hob 10, the intermediate portions 23 of the teeth 13b also are formed on an Archimedean spiral so that these teeth are effective in generating the final form of the gear teeth 11 to a point somewhat nearer the tips of the gear teeth than do the hob teeth 13a. Thus, with reference to FIG. 1, the tip portions 16, 17 and 18 of all the hob teeth are formed on the Archimedean spirals 24. The intermediate portions 19 and 23 of the teeth 13 and 13b are formed on the Archimedean spirals 25, and root portions 20 of the teeth 13 are formed on the Archimedean spirals 26. On the other hand, the intermediate portions 27 of the teeth 13a are formed on the radius 28 and the root portions 21 and 22 of the teeth 13a and 13b are formed on the radius 29.

As a second but complementary aspect of the present invention, the teeth 13 of the hob 10 are formed in a novel manner to permit the metal to be removed from the gear teeth 11 by the finishing tool to be located selectively along the sides of the gear teeth so as to reduce the stresses on both the gear teeth and the finishing tool during the finishing operation. This is based upon the recognition that while, for a proper finish it is necessary that the finishing cut be made at a certain minimum depth, at the same time, the depth of metal to be removed need not be uniform throughout the full length of the side of the gear tooth.

The selective location of the metal to be removed in the finishing operation is illustrated, in a somewhat exaggerated manner, in FIG. 3. Thus, the teeth 11 of the gear in their final form as cut by the hob 10 are shown in full lines and the shape of the gear teeth after finishing is indicated at 30 by broken lines whereby the metal between the full and broken lines is the metal to be removed by the finishing tool. It will be seen that metal to be removed in the general area indicated at $a$, which is spaced inwardly from the tips of the gear teeth, is greater than at the tips and roots of the teeth. Moreover, the depth of the metal to be removed at the area $a$ is substantially greater than the minimum depth necessary to make an acceptable finishing cut while the depth at the tips and roots may be as small as that minimum. The area $a$, according to the invention is located selectively at a position where, during the finishing operation, the stresses on both the gear teeth and the finishing tool are minimized. The exact location of the area $a$ will vary somewhat depending upon the particular profile of the gear teeth 11 but it is spaced a substantial distance from both the tips and the roots of the gear teeth.

In order to locate the area $a$ selectively, the side cutting edges of at least the full depth teeth 13 are formed with a changing angle from the tip of the tooth to the root and the angle changes in a direction to increase the width of the tooth from the tip to the root. Herein, the side cutting edges of the teeth 13b also are formed with a similar changing angle from the tip through the intermediate portion 23. While a continuously changing angle may be used, it is preferred to have a discreet change in angles and to change the angle at the outer Archimedean spiral or spirals as the case may be. Thus, in the preferred embodiment, the sides of each full depth tooth 13 have three distinct angles with two discreet angle changes occurring at the Archimedean spirals 24 and 25.

The profile of the cutting face of a full depth tooth 13 is illustrated in FIG. 4. The tooth has a full radius cap 31 and the side edges of the tip portion 16 is disposed at an angle $b$ relative to the radial centerline $x$ of the tooth. (For convenience, the angles of this tooth and of the other teeth are shown relative to lines parallel to the centerlines.) The side edges of the intermediate portion 19 make a larger angle $c$ with the centerline and the edges of the root portion 20 make a still larger angle $d$. The tooth is symmetrical and typical angles which have been found satisfactory are: angle $b$ equals 18 degrees, angle $c$ equals 20 degrees, and angle $d$ equals 23 degrees.

It wil be understood that the angles $b$, $c$ and $d$ will vary from cutter to cutter and should be selected according to the tooth form to be cut to position the area $a$ in the desired location. Also, when cutting short tooth forms, there may be only two angles and one angle change. Further, the cutter designer also will find that he can decrease the stresses on the teeth and improve the cutter efficiency by the angles he selects and the positions of the angle changes.

As illustrated in FIG. 5, each tooth 13a also is formed with a full radius cap 31 and the tip portion 17 has the same form as the tip portion 16 of the tooth 13, that is, it makes the same angle $b$ with the radial centerline $y$. Because the tooth 13a is formed on a radius below the tip portion, each side edge of the intermediate portion 27 is divided in two parts 32 and 33 with the outer part being either substantially parallel to the centerline $y$ or making a small angle therewith, such as 5 degrees. The other part 33 makes the angle $c$ with the centerline and the root portion 21 makes the angle $d$, these being the same as the angles $c$ and $d$ for the tooth 13.

FIG. 6 shows the profile of a tooth 13b and it will be seen that the tip and intermediate portions 18 and 23 are the same as the corresponding portions 16 and 19 of a tooth 13, that is, the tooth is formed with a full radius cap 31 and the edge of the tip portion forms the angle $b$ with the tooth centerline $z$ while the intermediate portion forms the angle $c$. Because the root portion 22 is formed on a radius, each side edge is divided in two parts 34 and 35 with the outer part 34, like the part 32 of the tooth 13a, being generally parallel to the centerline $z$. The inner part 35, however, forms the angle $d$ with the centerline. Again, the magnitudes of the angles $b$, $c$ and $d$ for the tooth 13b are the same as for the corresponding angles of the tooth 13.

With the teeth formed as described above, the tip portions 16, 17 and 18 of all the teeth 13, 13a and 13b generate the final form of the root portions of the gear teeth 11, that being the area where the greatest stress is applied to the hob teeth. Also, the intermediate portions 19 and 23 of the hob teeth 13 and 13b generate the final form of the intermediate portions of the gear teeth while only the root portions 20 of the teeth 13 generate the final form of the tip portions of the gear teeth, the area where the least stress is applied to the hob teeth. With the non-cutting portions of the teeth 13a and 13b, that is, the portions radially inward of the gashes 15a and 15b, being formed on radii, these portions are comparatively wide in profile but still do not result in any interference in the cutting operation (see FIGS. 4, 5 and 6). Thus, the partial teeth are stronger as compared to the teeth of prior cutters and this permits the cutter to remove a greater volume of metal per unit of time.

The hob 10 may be formed by cutting a helical thread 14a (FIG. 7), which is narrower than the final thread 14, and the gashes 15, 15a and 15b in the usual manner and the tooth profiles may be formed on a conventional back-off machine. In this case, however, three separate back-off operations are employed each using separate forming tools 36, 37 and 38 (FIGS. 7a through 13). Thus, in the first operation, the tool 36 forms the tip portions 16, 17 and 18 of the teeth 13, 13a and 13b respectively, in the second operation, the tool 37 forms the intermediate portions 19, 27 and 23 and the tool 38 forms the root portions 20, 21 and 22 in the third operation.

More specifically, the first forming tool 36 is shown in FIGS. 7a, 7b and 7c as it generates the tip portions 16, 17 and 18 on the teeth 13, 13a and 13b respectively. The tool is symmetrical and includes rounded edges 39 which form half of the caps 31 and which merge with edges 40. The latter generates the tip portions 16, 17 and 18 and beyond the edges 40 are tapered edges 41 which form the run-by section of the tool. As shown in FIG. 13, the run-by section cuts into a part of the interdental spaces between the intermediate portions 19, 27 and 23 of the hob teeth but is tapered sufficiently that it does not impart a final form to these portions and the metal left to be removed after the cut by the run-by section is indicated at 42.

The cam (not shown) used on the back-off machine with the tool 36 feeds the tool so that it generates the tip portions of all of the teeth of the hob on the Archimedean spirals 24 (FIG. 1). In other words, the cam makes one revolution for each tooth and has a changing peripheral contour so that the tool is fed in on such a spiral as the cuts from the leading edge to the trailing edge of a tooth and then the tool is backed off. The tool is fed and then backed off in a like manner for every tooth of the hob. Thus, as a comparison of FIGS. 7a, 7b and 7c illustrates, the tip portions 16, 17 and 18 generated by the tool 36 on the teeth 13, 13a and 13b are identical and the metal removed by one side of the tool 36 is shown by the shaded area 43 in FIG. 10 (see also FIG. 7a). The metal removed from the teeth 13a and 13b is shown at 43′ and 43″ in FIGS. 7b and 7c.

FIGS. 8a, 8b and 8c illustrate the manner in which the second forming tool 37 generates the intermediate portions 19 and 23 of the teeth 13 and 13b and cuts the intermediate portions 27 of a tooth 13a. The cam used in conjunction with this tool in the back-off machine generates the intermediate portions 19 and 23 on the Archimedean spirals 25 and has round bottom or circular segments to cut the intermediate portions 27 on the radius 28. More particularly, the cam makes one revolution for every two teeth and the first half of the cam has changing peripheral contour to cause the tool 37 to feed in on the Archimedean spirals 25 (FIG. 1) and the second half of the cam is circular so that the tool cuts on the radius 28. With the arrangement of teeth of the hob shown herein, the cam causes the tool 37 to feed in on the Archimedean spiral 25 as it cuts the intermediate portion 19 of a tooth 13 and then causes the tool to cut the intermediate portion 27 of the trailing tooth 13a on the radius 28. Then the tool 37 backs off and feeds in on the Archimedean spiral 25 as it cuts the intermediate portion 23 of the next tooth 13b and then the circular portion of the cam causes the tool to cut the intermediate portion 27 of the next tooth 13a on the radius 28. In other words, the tool backs off every two teeth of the hob and, in between, it cuts the first tooth on the Archimedean spiral 25 and the next tooth on the radius 28. Like the tool 36, the sides of the tool 37 have edges 44 which cut the intermediate portions of the hob teeth and also have tapered edges 45 which define the run-by section of the tool and cut into a part of the interdental space between the root portions of the hob teeth but is short of the final form of the root portions as indicated at 46 in FIG. 13. Behind the edges 44 are generally straight edges 46 which cut the sections 32 of the teeth 13a (FIG. 8b). The metal removed from a tooth 13 by the tool 37 is shown by the shaded area 48 in FIG. 11 (see also FIG. 8a) and the metal removed from the teeth 13a and 13b is shown at 48′ and 48″ in FIGS. 8b and 8c.

Figure 9B:
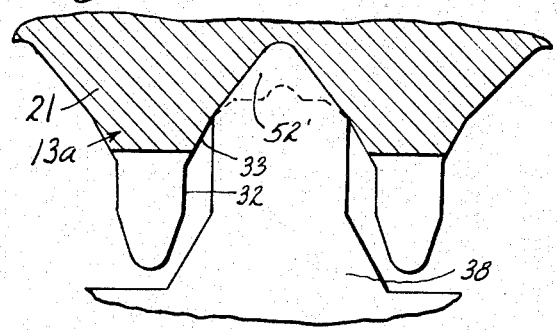
FIG. 9b is a view similar to FIG. 5 and showing a third forming tool.
Figure 9C:
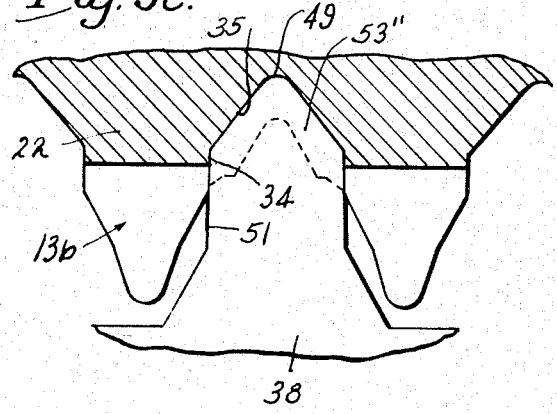
FIG. 9c is a view similar to FIG. 6 and showing a third forming tool.
Figure 10:
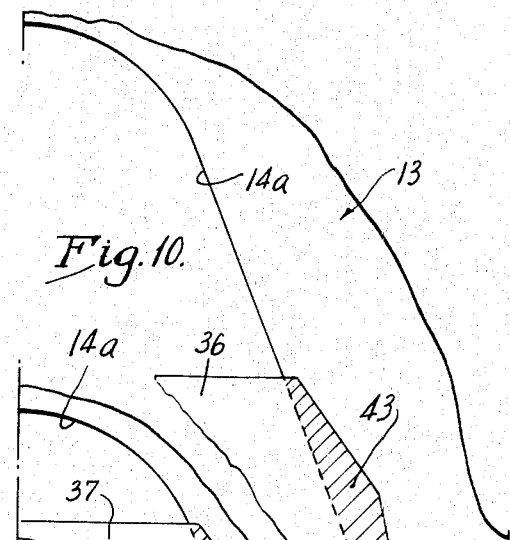
FIG. 10 is an enlarged fragmentary sectional view of the forming tool illustrated in FIGS. 7a, 7b and 7c.
Figure 11:
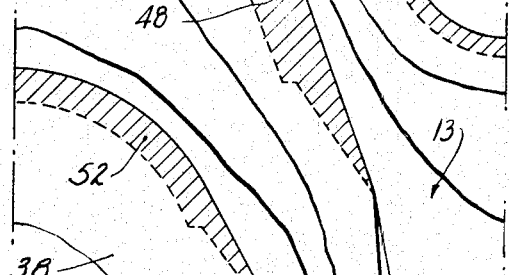
FIG. 11 is an enlarged fragmentary sectional view of the forming tool shown in FIGS. 8a, 8b and 8c.
Figure 12:
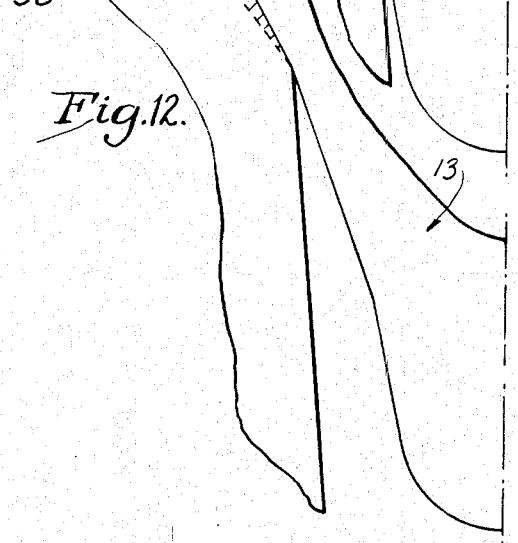
FIG. 12 is an enlarged fragmentary sectional view of the forming tool shown in FIGS. 9a, 9b and 9c.

The third forming tool 38 generates the root portion 20 of the teeth 13 and cuts the root portions 21 and 22 of the teeth 13a and 13b as illustrated in FIGS. 9a, 9b and 9c. The tip 49 of this tool is arcuate and merges into inclined cutting edges 50. Behind the latter are generally straight edges 51. In this case, the cam makes one revolution for every four teeth and the first one-fourth of the cam has a changing peripheral contour to feed the tool 38 in on the Archimedean spirals 26 and the remainder of the cam is circular to cause the tool to cut on the radius 29. Thus, the tool is backed off every four teeth of the hob and the cam causes the tool to feed in on the Archimedean spiral 26 as it generates the root portion 20 of a tooth 13. Then the cam causes the tool to cut the root portions 21 and 22 of the teeth 13a and 13b on the radius 29 and then the tool is backed off and the cycle is repeated. As shown in FIG. 9c, the straight edges 51 of the tool cut the sections 34 of the teeth 13b. The metal removed from a tooth 13 is shown by the shaded area 52 in FIG. 12 (see also FIG. 9a) and the metal removed from the teeth 13a and 13b is shown by the areas 52′ and 52″ in FIGS. 9b and 9c.

The angle of the cutting edges 40 of the tool 36 are such as to generate the edges of the tip portions of the hob teeth to make the selected angle $b$ with the centerlines of the teeth. Similarly, the edges 44 of the tool 37 generate the edges of the intermediate portions 19 and 23 of the teeth 13 and 13b so that these edges form the angle $c$ with the centerlines $x$ and $z$. Finally, the edges 50 of the tool 38 generate the root portions 20 of the teeth 13 whereby these portions make the angle $d$ with the centerlines $x$.

It will be observed that a milling cutter, and particularly a hob, constructed in accordance with the present invention has stronger teeth as compared to prior cutters of this type and, as a result, the cutter is capable of removing a greater amount of metal per unit of time. Further, the cutter, when used as a roughing tool, permits the selective location of the metal to be removed in the finishing operation and thus the stresses on the finishing tool and the teeth of the workpiece may be reduced.

I claim:

1. A hob for cutting gears and the like, said hob comprising, a cylindrical body, a plurality of teeth extending helically around said body, said teeth being formed by generally longitudinally extending gashes and a helical thread to form cutting edges at the outer tip and along the sides of each tooth at the leading face thereof, said teeth being formed in repeating sets with each set including at least two teeth, the gashes which form the leading face of at least first one of the teeth of each set being full-depth gashes to produce full-depth teeth thereby to cause each such tooth to generate the profile of a tooth of a workpiece through the full depth of the interdental spaces of the workpiece being formed by the hob and the remaining gashes being of a lesser depth, the profiles of said full depth teeth having side edges defined by a changing angle relative to the radii of the teeth, the angle increasing from the tip to the root, the remaining gashes being shallower to form partial teeth, the profiles of said partial teeth having side edges defined by other portions at an angle relative to the radii of the teeth, and extending substantially to said shallower gashes, the profiles of said partial teeth below said shallower gashes being first generally parallel to said radii and then making an angle relative to said radii which angle is greater than the angle defining the outer portions.

2. A hob as defined by claim 1 in which the changing angle of the profile of said full-depth teeth is defined by at least one discreet angle change.

3. A hob as defined by claim 1 in which the angular profile of said outer portions of said partial teeth is the same as the angular profile of the corresponding portions of said full-depth teeth.

4. A hob as defined by claim 1 in which said remaining gashes are divided into two groups of different depths to the define first and second partial teeth with the first partial teeth being longer than the second partial teeth, each of said sets including at least one full-depth tooth, one first partial tooth and one second partial tooth.

5. A hob for cutting gears and the like, said hob comprising, a cylindrical body, a plurality of teeth extending helically around said body, said teeth being formed by generally longitudinally extending gashes and a helical thread to form cutting edges at the outer tip and along the sides of each tooth at the leading face thereof, said teeth being formed in repeating sets with each set including at least two teeth, the gashes which form the leading face of at least one tooth of each set being full-depth gashes to produce full-depth teeth thereby to cause each such tooth to generate the profile of a tooth of a workpiece through the full depth of the interdental spaces of the workpiece being formed by the hob and the remaining gashes being of a lesser depth to form partial teeth, the tips of all of said teeth being formed on an Archimedean spiral, the sides of each of said full-depth teeth being formed on an Archimedean spiral to approximately the effective depth of the gashes forming the leading faces of the full-depth teeth, the sides of said partial teeth being formed on an Archimedean spiral to approximately the effective depth of the gashes forming the partial teeth and being formed on a radius from the gashes to the bottoms of said threads, the profiles of said full-depth teeth having side edges defined by a changing angle relative to the radii of the teeth, the profiles of said partial teeth having side edges defined by outer portions at an angle relative to the radii of the teeth and extending substantially to said remaining gashes, the profiles of said partial teeth below said remaining gashes being first generally parallel to said radii and then making an angle relative to the radii which angle is greater than the angle defining the outer portions.

6. A hob as defined by claim 5 in which the changing angle of the profile of said full-depth teeth is defined by at least one discreet angle change.

7. A hob as defined by claim 5 in which the angular profile of said outer portions of said partial teeth is the same as the angular profile of the corresponding portions of said full-depth teeth.

8. A hob as defined by claim 5 in which said remaining gashes are divided into two groups of different depths to define first and second partial teeth with the first partial teeth being longer than the second partial teeth, each of said sets including at least one full-depth tooth, one first partial tooth and one second partial tooth.

9. A hob as defined by claim 8 in which the angular profiles of said outer portions of said first and second partial teeth is the same as the angular profile of the corresponding portions of said full-depth teeth.

10. A hob as defined by claim 9 in which the chang-

7. A kob as defined by claim 5 in which the angular pro-angle changes and the profile of the outer portions of said first partial teeth are defined by a changing angle with at least one discreet angle change.

11. A hob for cutting gears and the like, said hob comprising, a cylindrical body, a plurality of teeth extending helically around said body, said teeth being formed by generally longitudinally extending gashes and a helical thread to form cutting edges at the outer tip and along the sides of each tooth at the leading face thereof, said teeth being formed in repeating sets with each set including at least two teeth, the gashes which form the leading face of at least one tooth of each set being full-depth gashes to produce full-depth teeth thereby to cause each such tooth to generate the profile of a tooth of a workpiece through the full depth of the interdental spaces of the workpiece being formed by the hob and the remaining gashes being of a lesser depth to form partial teeth, the tips of all of said teeth being formed on an Archimedean spiral, the sides of each of said full-depth teeth being formed on an Archimedean spiral to approximately the effective depth of the gashes forming the leading faces of the full-depth teeth, the sides of said partial teeth being formed on an Archimedean spiral to approximately the effective depth of the gashes forming the partial teeth and being formed on a radius from the gashes to the bottoms of said threads.

12. A hob as defined by claim 11 in which said remaining gashes are divided in two groups of different depths to define first and second partial teeth with the first partial teeth being longer than said second partial teeth, each of said sets including at least one full-depth tooth, one first partial tooth and one second partial tooth.

References Cited

UNITED STATES PATENTS

| 3,374,518 | 3/1968 | Bentjens | 29—103 |
| 1,096,164 | 5/1914 | Fawcus | 29—103 B |

FOREIGN PATENTS

| 175,937 | 3/1922 | Great Britain | 29—103 |

LEONIDAS VLACHOS, Primary Examiner